(12) United States Patent
Söhn (10) Patent No.: US 11,674,755 B2
(45) Date of Patent: Jun. 13, 2023

(54) METHOD FOR TREATING POURABLE, INORGANIC GRAIN, AND ROTARY TUBE SUITABLE FOR PERFORMING THE METHOD

(71) Applicant: Heraeus Quarzglas GmbH & Co. KG, Hanau (DE)

(72) Inventor: Matthias Söhn, Hanau (DE)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 372 days.

(21) Appl. No.: 16/872,775

(22) Filed: May 12, 2020

(65) Prior Publication Data
US 2020/0363129 A1 Nov. 19, 2020

(30) Foreign Application Priority Data

May 17, 2019 (EP) .................................... 19175219

(51) Int. Cl.
*F27B 7/06* (2006.01)
*F27B 7/04* (2006.01)
(Continued)

(52) U.S. Cl.
CPC ................. *F27B 7/06* (2013.01); *B01J 8/087* (2013.01); *B01J 8/10* (2013.01); *C01B 33/037* (2013.01);
(Continued)

(58) Field of Classification Search
CPC .................................... F27B 7/362; F27B 7/04
See application file for complete search history.

(56) References Cited

U.S. PATENT DOCUMENTS 5,637,284 A * 6/1997 Sato .................... C03B 19/1095
106/482
7,837,955 B2 11/2010 Goldblatt et al.
(Continued)

FOREIGN PATENT DOCUMENTS

CN 109269294 1/2019
DE 10 2010 021 693 12/2011
(Continued)

OTHER PUBLICATIONS

Continental Trade (Year: 2016).*
Continental Trade Accessibility Date (Year: 2022).*

*Primary Examiner* — Steven S Anderson, II
*Assistant Examiner* — Kurt J Wolford
(74) *Attorney, Agent, or Firm* — Dicke, Billig & Czaja, PLLC (57) ABSTRACT

In a known method for treating pourable, inorganic grain, a heated rotary tube is used that rotates about an axis of rotation and surrounds a treatment chamber that is divided into a plurality of treatment zones by means of separating elements. The grain is supplied to the treatment chamber at a grain inlet side and is transported, in a grain transport direction, to a grain outlet side and is exposed to a treatment gas in the process. In order, proceeding herefrom, to allow for reliable and reproducible thermal treatment of pourable inorganic grain, in particular $SiO_2$ grain in the rotary kiln, in a manner having low and effective consumption of treatment gas, it is proposed for spent treatment gas to be suctioned out of a reaction zone of the treatment chamber, by a gas manifold that rotates about the longitudinal axis thereof.

15 Claims, 2 Drawing Sheets

(51) Int. Cl.
*F27B 7/30* (2006.01)
*F27B 7/36* (2006.01)
*F27D 3/00* (2006.01)
*F27D 7/06* (2006.01)
*F27B 7/02* (2006.01)
*B01J 8/08* (2006.01)
*B01J 8/10* (2006.01)
*C01B 33/037* (2006.01)

(52) U.S. Cl.
CPC .................. *F27B 7/04* (2013.01); *F27B 7/30* (2013.01); *F27B 7/362* (2013.01); *F27D 3/0033* (2013.01); *F27D 7/06* (2013.01); *B01J 2208/00557* (2013.01); *B01J 2219/187* (2013.01); *F27B 2007/025* (2013.01); *F27B 2007/046* (2013.01); *F27D 2007/063* (2013.01)

(56) References Cited

U.S. PATENT DOCUMENTS

| | | | |
|---|---|---|---|
| 9,446,377 B1 * | 9/2016 | McKinney | B01J 8/10 |
| 2010/0028239 A1 * | 2/2010 | Goldblatt | B01J 8/10 |
| | | | 423/335 |

FOREIGN PATENT DOCUMENTS

| | | | | |
|---|---|---|---|---|
| EP | 3536667 | | 9/2019 | |
| JP | 4413494 B2 * | | 2/2010 | ............ C10B 53/07 |
| WO | 88/03914 | | 6/1988 | |
| WO | 2010/037473 | | 4/2010 | |
| WO | 2017062949 | | 4/2017 | |
| WO | WO-2017062949 A1 * | | 4/2017 | |
| WO | 2018084134 | | 5/2018 | |

* cited by examiner

METHOD FOR TREATING POURABLE, INORGANIC GRAIN, AND ROTARY TUBE SUITABLE FOR PERFORMING THE METHOD

CROSS-REFERENCED TO RELATED APPLICATION

This Utility patent application claims priority to European Application No. 19 175 219.5 filed on May 17, 2019, which is incorporated herein by reference.

TECHNICAL FIELD

One aspect relates to a method for treating pourable, inorganic grain in a heated rotary tube that rotates about an axis of rotation and surrounds a treatment chamber that is divided into a plurality of treatment zones, including at least one reaction zone, by means of separating elements, wherein the grain is supplied to the treatment chamber at a grain inlet side and is transported, in a grain transport direction, to a grain outlet side and is exposed to a treatment gas in the process.

One aspect relates to a rotary tube for treating pourable, inorganic grain, which tube is rotatable about an axis of rotation that is inclined relative to the horizontal, and which tube surrounds a treatment chamber for receiving the grain, which chamber is divided into a plurality of treatment zones, including at least one reaction zone, by means of separating elements, and includes a grain inlet side for introducing the grain into the treatment chamber, and a grain outlet side for discharging the grain from the treatment chamber, and a gas inlet for introducing a treatment gas into the reaction zone, and a gas outlet for removing spent treatment gas from the treatment chamber.

Treatment methods of this kind, using a rotary kiln, are used for example for purifying amorphous or crystalline grain, in particular consisting of $SiO_2$.

BACKGROUND $SiO_2$ grains are used as the raw material for producing quartz glass. In many applications of quartz glass, for example as a component for use in semiconductor manufacture, or for optics, high requirements are placed on the purity, which requirements can be achieved only by means of significant time, material and costs.

Impurities such as iron, titanium, alkali and alkaline earth metals are removed by means of treatment under chlorinated atmosphere at high temperature (thermochlorination). A method of this kind for continuous purification of quartz powder by means of thermochlorination in a rotary kiln is described in U.S. Pat. No. 5,637,284 A. The quartz powder to be purified is continuously supplied to an inlet side of an obliquely positioned and electrically heated rotary tube consisting of quartz glass, and passes, therein, successively through a preheating chamber, a reaction chamber and a gas desorption chamber. The respective chambers are separated from one another by means of permeable separating elements which are also used for mixing the quartz powder. In the preheating chamber, the quartz powder is heated to approximately 800° C., before it is treated with a gas mixture of chlorine and hydrogen chloride, in the reaction chamber, at a temperature of approximately 1300° C. Said gas mixture is introduced into the reaction chamber from the outlet side by means of a gas lance that extends in the longitudinal axis of the rotary tube. The gas mixture reacts with impurities of the quartz powder, forming gaseous metal chlorides. The spent gas mixture and the gaseous reaction products are suctioned out in the desorption chamber. A further gas lance is used for this purpose, which lance protrudes into the desorption chamber from the outlet side.

The stationary lance for supplying the treatment gas deforms at high temperatures of for example 1200° C. As a result, the treatment gas comes into contact with the $SiO_2$ grain at varying points, causing the reproducibility of the purification results to suffer. Owing to the ends that are open at the end face, and the large cross sectional area of the rotary tube, the kiln radiates a large amount of heat at the end faces. The high temperature means that it is not possible to use sealed rotary joints at the hot ends of the rotary tube.

In the continuous purification method for $SiO_2$ grain in a rotary kiln, known from WO 2010/037473 A1, inserts such as vanes or studs are mounted in the interior of the rotary tube, which inserts are used for transporting and mixing the grain to be purified.

U.S. Pat. No. 7,837,955 B2 describes a continuous purification method for quartz sand in a rotary kiln, in which vertical separating plates are admitted into the rotary kiln, wherein the quartz sand is guided through between the outer edge of the separating wall and the inside wall of the rotary tube. In this case, the quartz sand is introduced into the rotary tube from one end, and the treatment gas is introduced into said tube from the other end. The internal pressure within the rotary tube may be higher than the pressure prevailing outside (atmospheric pressure).

WO 88/03914 A1 teaches reducing the BET surface of an amorphous, porous $SiO_2$-powder, using a rotary kiln, in a helium- and/or hydrogen-containing atmosphere. In one approach, fine $SiO_2$-soot dust is mixed with water, such that a moist, crumbly mass is obtained. This mass is transferred into a rotary kiln and is compressed, at a temperature of 600° C., to a powder having grain sizes of from 0.1 to 3 mm.

DE 10 2010 021 693 A1 describes continuous vitrification of a porous $SiO_2$ granulate into transparent, synthetic quartz glass grain. In this case, a granulate filling is heated by a laser beam, in a rotary kiln comprising a rotary tube rotating about the central axis thereof, and comprising an inside wall made of quartz glass. By generating a relative movement between the filling and the laser beam, uniform vitrification of the granulate particles is achieved, without agglomeration.

WO 2017/062949 A1 describes a system for degassing granular polysilicon in a rotary kiln, comprising a rotary tube that rotates about an axis of rotation and surrounds a treatment chamber comprising a plurality of sequential treatment zones. The division into treatment zones is achieved by stirring elements which are fastened to a shaft that protrudes into the rotary tube, and reach close to the rotary tube inside wall. The polysilicon grain to be treated reaches a grain outlet opening, from a grain inlet opening, via transfer openings in the stirring elements, and is exposed to a purge gas in the process.

WO 2018/084134 A1 describes a method for dehydrating particulate lithium hydroxide hydrate in a rotary kiln. The lithium hydroxide hydrate particles are introduced at one side of the rotary tube, supplied to a heating zone, and exposed there to an inert drying gas which is previously heated to a temperature of below 100° C. The drying gas is introduced via a gas introduction tube, and dried lithium hydroxide anhydride is drawn off at the other end of the rotary tube. From this side, a gas suction pipe protrudes into the reaction zone, by means of which pipe spent, hot drying gas is drawn off out of the heating zone. Directly introducing the heated drying gas into the heating zone prevents condensation of the water vapor-containing gas, which cannot flow back either. It is thus possible to prevent lithium hydroxide being able to adhere to and remain on the rotary tube.

CN 109 269 294 discloses an airtight rotary kiln in which feeding and emptying take place on the same side. The rotary kiln consists of a stove pipe, three covers arranged on the stove pipe outside wall, and a support bearing. The material to be treated is heated indirectly, via bundles of tubes that are distributed axially along the kiln. The waste gas is discharged outside of the kiln, by means of gas channel.

The degree to which the treatment gas acts on the grain in a rotary kiln depends on the action time and the temperature. In particular, the purification effect of the thermochlorination depends, for example, on the reaction duration of the $SiO_2$ grain with the chlorine-containing gas mixture, and on the reaction temperature.

At higher temperatures, chlorine reacts more quickly with the metal impurities, and therefore a better purification effect would be expected at higher temperatures. However, the possibility of increasing the temperature is limited for several reasons, inter alia because, at high temperatures, owing to the softening of the $SiO_2$ grain, agglomerates form which impede further access of the treatment gas to the surface of the individual grains. The purification effect of the treatment gas, which primarily acts at the surface of the grain, is reduced thereby.

The average residence time of a particle is dependent on the filling amount of the rotary tube: the greater the filling amount, the longer the contact time with the reactive gas, and thus the better the purification result. Vice versa, a comparatively large filling amount, at the same residence time, allows for a higher throughput. A longer residence time can also be achieved by a reduced rotational speed of the tube. As a result, however, the circulation of the content is also reduced, and thus the contact with the reaction gas.

A high proportion of false air in the treatment gas can lead to uncontrolled and undesired side reactions. Undefined and ineffective flow paths mean that the majority of the treatment gas remains unused, and has to be disposed of in a complex manner, by means of neutralization.

Dissolved impurities condense on cold regions of the rotary tube and are deposited, over time, as a solid. If the deposits fall into the $SiO_2$ grain to be treated, they cause errors or scrap in the subsequent further processing, such as when melting down the grain in order to produce quartz glass.

Accordingly, there is a need for a method that allows for reliable and reproducible thermal treatment of inorganic, pourable grain, in particular $SiO_2$ grain, in a rotary kiln, in particular purification by means of thermochlorination, associated with minimal and effective use of treatment gas.

Furthermore, there is a need for providing a rotary tube that is suitable for performing the method, is as reliable as possible, and is intended for use in a rotary kiln.

SUMMARY

With regard to the method, one aspect is a method of the type mentioned at the outset, in that spent treatment gas is suctioned out of the reaction zone by means of a gas manifold that rotates about the longitudinal axis thereof.

The treatment chamber defined by the rotary tube inner bore is divided into a plurality of zones (also designated as "chambers") by means of separating elements, for example by means of quartz glass plates. The zones are designed for different functions, such as preheating or cooling the grain, respectively before and after actual high-temperature treatment, which takes place primarily in the reaction zone.

During thermal treatment, it is desirable for the action of the treatment gas on the grain to be as uniform as possible. The treatment is used for example for purifying the inorganic grain, in particular $SiO_2$ grain, wherein, in this case the treatment gas may contain halogen-containing substances.

BRIEF DESCRIPTION OF THE DRAWINGS

The invention will be explained in greater detail in the following, with reference to one embodiment and drawings. In detail, in the schematic figures.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

The method according to one embodiment aims for waste gas, i.e. spent, impure treatment gas, to come into contact as little as possible with the grain to be treated. For this purpose, the spent treatment gas is suctioned out of the reaction zone by means of a gas manifold that rotates about the tube longitudinal axis thereof and that ends at a "suction end" of the rotary tube. In one embodiment, this results in a plurality of advantages:

The spent treatment gas, guided in the gas manifold, is separated from the grain. In this respect, the gas manifold provides a material transport path for the spent treatment gas that is separate from the grain to be treated.

The cross section of the gas manifold, which is smaller than the inside diameter of the rotary tube, allows for effective suctioning of at least a portion of the spent treatment gas out of the reaction zone.

Effective removal, from the treatment chamber, of spent treatment gas that is laden with impurities, suppresses condensation at cold points in the treatment chamber, and deposits, and the associated disruptions and impurities of the grain.

In the simplest and preferred case, the axis of rotation of the rotary tube and the tube longitudinal axis of the gas manifold extend coaxially. Since the gas manifold preferably rotates in the axis of rotation of the rotary tube, deformation owing to high temperatures is prevented. The effectiveness of suctioning spent treatment gas out of the reaction zone is therefore reproducible and is temporally largely constant for example.

In one embodiment, spent treatment gas is advantageously suctioned out of the gas manifold by means of a rotationally fixed suction pipe.

The suction pipe is not connected to the gas manifold. Said pipe protrudes for example into the gas manifold, or adjoins the gas manifold as tightly as possible but in a contactless manner. The waste gas of the rotary kiln can be very hot, which makes it more difficult to achieve a sealed rotary joint for removal of the hot treatment gas at this point. Since the suction pipe is not rigidly mechanically connected to the rotating gas manifold, a fixed suction pipe can be used, and a rotary joint can therefore be omitted. The suction pipe is located at the end of the material transport path for the treatment gas. Said pipe can additionally be cooled, in that external air from outside the gas manifold is additionally suctioned in. The treatment gas that is suctioned out, and the external air that is suctioned out in the process, no longer come into contact with the grain to be treated.

In a particularly preferred procedure, a suction pipe is used that penetrates into the gas manifold.

The temperatures inside the rotary tube and the treatment gas decrease towards the "suction end." The end of the suction pipe that protrudes into the gas manifold can be shifted to a position inside the rotary tube, where a temperature above the condensation temperature still prevails. Since the temperature at the effective suction position is higher than the condensation temperature, when the spent treatment gas cools condensation takes place within the suction pipe. The deposits forming there cannot enter the grain. The suction pipe is changed from time to time, owing to the deposits.

The treatment gas is in one embodiment introduced into the gas manifold at the grain outlet side and conveyed from one chamber to the next chamber, counter to the grain transport direction, wherein said gas emerges from the gas manifold, into the reaction zone, through at least one gas outlet opening, and the spent treatment gas enters the gas manifold again, from the reaction zone, through at least one gas inlet opening.

Introducing the treatment gas into the treatment chamber in counterflow to the transport direction of the grain ensures that the largely ready-treated, for example largely purified $SiO_2$ grain comes into contact only with fresh, less laden treatment gas.

The gas manifold allows for defined and accurately targeted introduction of the treatment gas into the reaction zone, in manner having comparatively little false air. Undefined and ineffective flow paths are largely prevented. The impurities brought in together with the false air introduction and created by reaction, are reduced. Effective use of the treatment gas reduces the material and disposal costs.

Rotating the gas manifold about the longitudinal axis thereof, in one embodiment about the rotary tube axis of rotation, also prevents deformation in the region of the introduction of the treatment gas into the treatment chamber, such that the position of the gas introduction into the reaction zone, and the action of the treatment gas on the grain, is temporally constant, and a reproducible interaction between the treatment gas and the grain is ensured.

In this case, viewed in the flow direction of the treatment gas, the at least one gas outlet opening is located as close as possible to the start of the reaction zone, and the at least one gas inlet opening is located as close as possible to the end of the reaction zone.

The gas outlet opening can be designed as the front wall opening of the gas manifold, and the gas inlet opening can be designed as the rear wall opening of the gas manifold, wherein, in this case, the gas manifold is closed at least in part, in one embodiment entirely, over the length thereof between the front and the rear wall opening. In this case, a gas manifold can be used which extends through the entire treatment chamber, and the longitudinal axis of which extends coaxially to the rotary tube axis of rotation.

In view of as effective as possible a forced flow of fresh treatment gas through the inorganic grain, in the reaction zone, it is advantageous in one embodiment for the front wall opening and the rear wall opening to be at different circumferential angles of the gas manifold lateral surface, in one embodiment on opposing circumferential sides.

As complete as possible a discharge of the treatment gas from the gas manifold can also be ensured, however, if the gas manifold is made up of separated lengths of pipe, wherein the front length of pipe, viewed in the flow direction of the treatment gas, ends at the front separating element or at most extends a little way from there into the reaction zone, and the rear length of pipe ends at the rear separating element or at most extends a little way from there into the reaction zone. In this case, the gas outlet and gas inlet openings can in principle be designed as end-face pipe openings, but there are in one embodiment openings in the pipe wall of the length of pipe, in order to force deflection of the treatment gas out of the central axis of the reaction chamber, in the direction of the grain.

The treatment gas is introduced into the reaction chamber from the gas manifold, via the gas inlet openings, and at least a portion of the treatment gas is suctioned back into the gas manifold, via the gas inlet opening, and conveyed further in the gas manifold. This also contributes to a pressure gradient having a lower pressure in the gas phase of the rotary tube inner bore at the suction end of the rotary tube. The pressure gradient is established automatically, either due to suctioning out the spent treatment gas on one side, at the "suction end" or due to suctioning out on both sides, at the rotary tube, but having a higher suction capacity at the "suction end," and it brings about transport of the treatment gas and of spent treatment gas in the direction of the suction end of the rotary tube.

The gas manifold is in one embodiment rotationally fixed to at least one separating element, and the separating elements each include a transfer opening for allowing grain through from one zone to the next zone.

The separating elements are rigidly connected to the rotary tube and rotate together therewith. Since the gas manifold is rigidly connected to at least one of the separating elements, in one embodiment to all of the separating elements, it rotates synchronously with the rotary tube, without a separate drive being required therefor. The transfer openings form passages between two adjacent treatment zones in each case, and ensure a continuous transport path for the grain. Each separating element can include one transfer opening or a plurality of transfer openings. There is no specification of the position of the transfer opening on the separating element or for the positions and the distribution of a plurality of transfer openings on the separating element.

In this case, the separating elements are in one embodiment equipped with at least one grain baffle which plunges into the grain as a result of the rotation of the rotary tube and transports entrained grain to the transfer opening in the process.

The grain baffle is located on the side of the separating element which faces the flowing grain. As a result of the rotary tube rotation, the grain baffle scoops the grain through the transfer opening, from one treatment zone into the adjacent treatment zone. Said baffle is designed for example as a tube half-shell or a chute that ends at the transfer opening.

The separating elements that are equipped with grain baffles of this kind are used not only for dividing the treatment chamber into a plurality of zones, but furthermore bring about or facilitate the transport of the grain from one treatment zone into the next treatment zone, as a result of the rotation of the rotary tube about the axis of rotation thereof.

In one embodiment of the method, the separating elements equipped with grain baffles of this kind are also used for controlling the grain throughput. This is because, in the case of opposing rotation of the rotary tube, the grain baffles do not act as scoops for the $SiO_2$ grain, but rather, on the contrary, push the grain away from the transfer opening, such that the further grain transport can be halted.

Viewed in the grain transport direction, a front separating element is arranged downstream of the grain inlet side, and a rear separating element is arranged upstream of the grain outlet side, wherein it has been found to be advantageous in one embodiment for the front and/or rear separating element to be formed of opaque quartz glass.

The opaque quartz glass reflects thermal radiation from the treatment chamber and thus shields the grain inlet and/or outlet side from the heat of the reaction zone. The rear opaque quartz glass separating element shields the grain outlet side for example (equivalent to the introduction side for the treatment gas) from heat, and thus makes a rotary joint possible for the rotating gas manifold in the treatment chamber.

In view of effective thermal shielding, a method variant is advantageous in one embodiment in which the rotary tube includes unheated end-face end portions, wherein the front and the rear separating element are each arranged in an unheated end-face end portion.

In this connection, it has also been found to be advantageous in one embodiment for the gas manifold to include a length portion that protrudes out of the rotary tube at the grain outlet side, and for at least said length portion to be made of opaque quartz glass.

The opaque quartz glass length portion reflects thermal radiation and reduces the conduction in the wall of the gas manifold to the end-face end at the grain outlet side. This contributes to it being possible for the rotating gas manifold to be guided into the treatment chamber via a rotary joint, and thus for the treatment gas to be introduced into the treatment chamber without any external air.

With regard to the rotary tube, the object specified above is achieved according to one embodiment, proceeding from a rotary tube of the type mentioned at the outset, in that gas outlet includes a gas manifold that rotates about the longitudinal axis thereof.

The treatment chamber defined by the rotary tube inner bore is divided into a plurality of zones (also designated as "chambers") by means of separating elements, for example by means of quartz glass plates. The zones are designed for different functions, such as preheating or cooling the grain, respectively before and after actual high-temperature treatment, which takes place primarily in the reaction zone.

For the purpose of suctioning spent treatment gas out of the reaction zone, the rotary tube according to one embodiment includes a gas manifold that is rotatable about the tube longitudinal axis thereof and ends at a "suction end" of the rotary tube. In one embodiment, this results in a plurality of advantages:

The spent treatment gas, guided in the gas manifold, is separated from the grain. In this respect, the gas manifold provides a material path for the spent treatment gas that is separate from the grain to be treated.

The cross section of the gas manifold, which is smaller than the inside diameter of the rotary tube, allows for effective suctioning of at least a portion of the spent treatment gas out of the reaction zone.

Effective removal, from the treatment chamber, of spent treatment gas that is laden with impurities, suppresses condensation at cold points in the treatment chamber, and deposits, and the associated disruptions and impurities of the grain.

In the simplest and preferred case, the axis of rotation of the rotary tube and the tube longitudinal axis of the gas manifold extend coaxially. Since the gas manifold can in one embodiment rotate in the axis of rotation of the rotary tube, deformation owing to high temperatures is prevented. The effectiveness of suctioning spent treatment gas out of the reaction zone is therefore reproducible and is temporally largely constant for example.

The gas outlet in one embodiment advantageously includes a suction pipe that protrudes into the gas manifold in a contactless manner, or adjoins the gas manifold without direct contact. The suction pipe is used for suctioning spent treatment gas out of the gas manifold.

The suction pipe is not rigidly connected to the gas manifold; it protrudes for example into the gas manifold, or adjoins the gas manifold as tightly as possible but in a contactless manner. Since the suction pipe does not have any mechanical contact with the rotating gas manifold, a rotationally fixed suction pipe can be used, and a rotary joint can therefore be omitted.

The advantageous embodiments of the rotary tube according to one embodiment, mentioned in the following, correspond to measures of the method according to one embodiment. For this purpose, reference is made to the explanations above, for each of the method measures.

The gas inlet is in one embodiment provided at a gas inlet end of the gas manifold which is located at the grain outlet end of the rotary tube.

The gas manifold in one embodiment advantageously includes a gas outlet opening for removing treatment gas from the gas manifold into the reaction zone, and at least one gas inlet opening for introducing treatment gas from the reaction zone into the gas manifold, wherein the gas manifold inner bore is in one embodiment closed, at least in part, between the gas outlet opening and the gas inlet opening.

It has been found to be expedient for the gas manifold to be rotationally fixed to at least one separating element, wherein the separating elements each include a transfer opening for allowing grain to pass through and through which opening the gas manifold extends, and that the separating elements are equipped with a grain baffle which is designed to plunge into the grain as a result of the rotation of the rotary tube and to transport entrained grain to the transfer opening in the process.

It has also been found to be expedient for a front separating element to be arranged downstream of the grain inlet side, and a rear separating element to be arranged upstream of the grain outlet side, viewed in the grain transport direction, wherein the front and/or rear separating element are formed of opaque quartz glass.

In this connection, it has been found to be expedient for the rotary tube to include unheated end-face end portions, wherein the front and the rear separating element are each arranged in an unheated end-face end portion.

In one embodiment of the rotary tube, the gas manifold includes a length portion that protrudes out of the rotary tube at the grain outlet side, wherein at least said length portion is made of opaque quartz glass.

Figure 1:
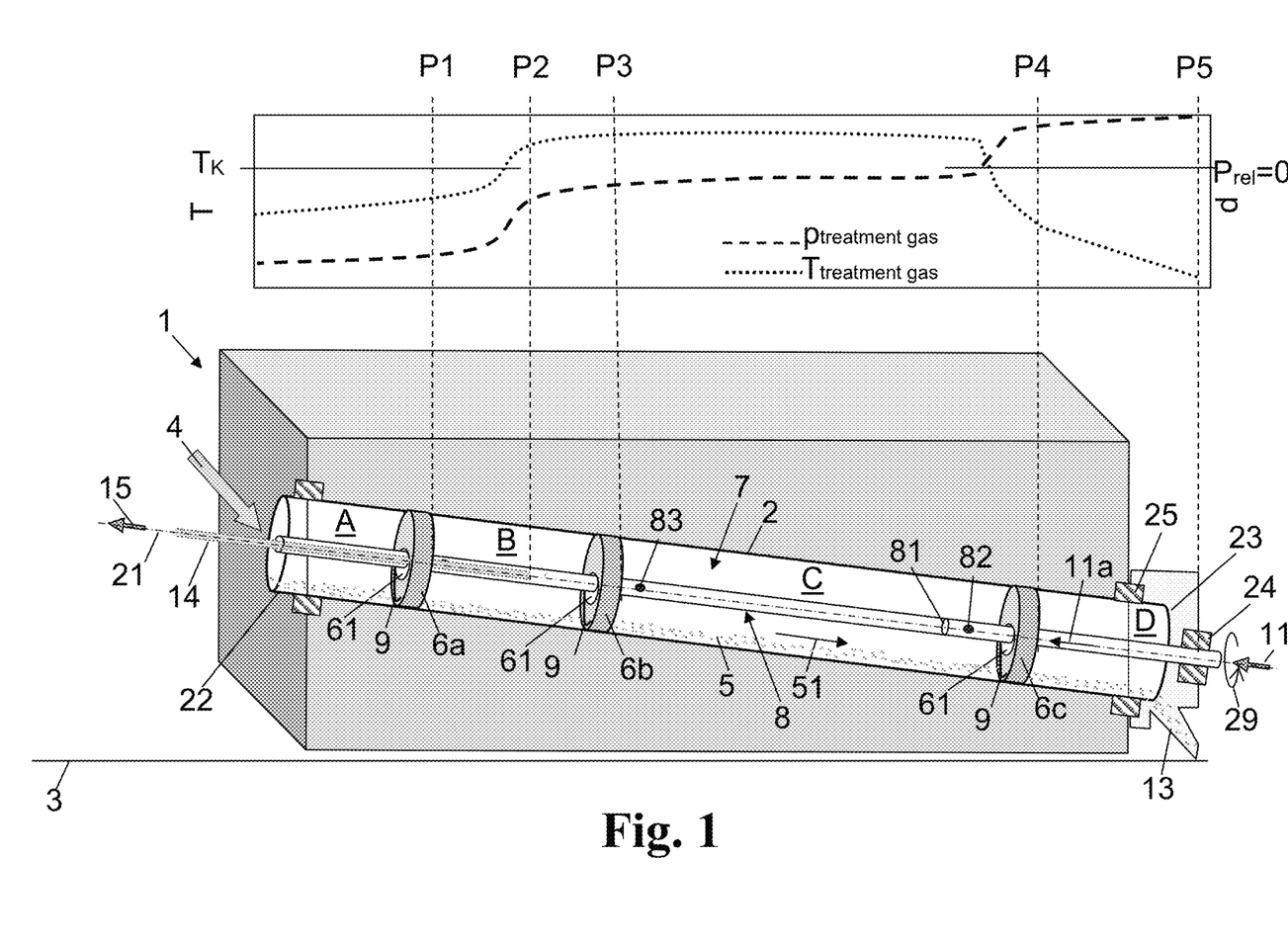
FIG. 1 is a three-dimensional view of a rotary kiln comprising a treatment chamber formed of a rotary tube consisting of quartz glass according to one embodiment.

The rotary kiln 1 illustrated schematically in FIG. 1 includes a rotary tube 2 made of quartz glass that can be rotated about an axis of rotation 21 that extends slightly obliquely to the horizontal 3 (angle of inclination approximately 4 degrees). $SiO_2$ grain 5 to be treated in the rotary kiln 1 is fed to the upper rotary tube end 22 (grain inlet side) via a filling device indicated by a block arrow 4. The direction arrow 51 indicates the direction of movement of the $SiO_2$ grain 5 during the treatment, as far as the lower rotary tube end 23 that is guided out of the housing of the rotary kiln 1 by means of roller bearings 25, and leads into a material removal device 13 for the treated $SiO_2$ grain.

The inner bore of the rotary tube 2 forms a treatment chamber 7 which is divided into four channels by means of quartz glass plates 6a, 6b, 6c, specifically into a material inflow chamber A, a preheating chamber B, a reaction chamber C, and a cooling or desorption chamber D. The quartz glass plate 6a, 6b, 6c are welded to the inside wall of the rotary tube 2, and each include a through-hole which is concentric to the rotary tube longitudinal axis and which is guided through a gas guide tube 8 made of quartz glass.

The gas guide tube 8 is used for supplying fresh treatment gas into the treatment chamber 7, and for removing spent treatment gas (waste gas) from the treatment chamber 7. Said guide tube extends through all the chambers A-D of the treatment chamber 7. In the treatment chamber 7, the wall of the gas guide tube 8 is provided with a plurality of wall openings, divided into a gas outlet opening 82 through which the treatment gas 11 emerges from the gas manifold 8 into chamber C, and a gas inlet opening 83 via which spent treatment gas re-enters the gas manifold 8 from treatment chamber C. Between the gas outlet opening 82 and the gas inlet opening 83, the gas manifold 8 is closed (closure 81). In order to improve the flow of fresh treatment gas through the $SiO_2$ grain 5 in the treatment chamber C, the gas outlet opening 82 and the gas inlet opening 83 are located (unlike what is illustrated schematically in FIG. 1), on opposite circumferential sides of the gas guide tube 8.

The gas manifold 8 is connected to the quartz glass plates 6 and, like these, is rotatable about the axis of rotation (rotary tube longitudinal axis 21). The gas manifold longitudinal axis, the rotary tube longitudinal axis 21 and the axis of rotation extend coaxially.

On the side thereof facing the inflowing $SiO_2$ grain 5, each quartz glass plate 6a, 6b, 6c is connected to a tube half-shell 9. This is merely indicated in FIG. 1, and can be seen more clearly in FIG. 2. One free limb of the tube half-shell 9 ends at the transfer opening 61, and the other ends close to the edge of the quartz glass plate 6a, 6b, 6c. In the event of a rotary tube rotation in the direction of rotation arranged with reference to the directional arrow 29, the peripheral limb plunges into the filling of the $SiO_2$ grain 5 and, upon further rotation, scoops the $SiO_2$ grain 5, entrained in the process, to the transfer opening 61, from where it reaches the chambers B, C, D which are arranged downstream in the transport direction 51. For this purpose, the transfer openings 61 are designed having an oval cross section and extend asymmetrically to the axis of rotation 21.

A resistance heating means (not illustrated in the drawing) is provided on the outer lateral surface of the rotary tube 8. The quartz glass plates 6a and 6c are located outside of the heated length portion of the rotary tube 2 and consist of opaque quartz glass that reflects thermal radiation.

The lower end of the gas guide tube 8 also consists of opaque quartz glass that reflects thermal radiation. Said end is guided out of the rotary kiln 1 through a rotary joint 24, and is connected to a line for supplying the treatment gas (indicated by the block arrow 11). The treatment gas 11 fed into the gas manifold 8 flows through the treatment chamber 7 in the opposite direction 11a from the grain transport direction 51.

At the upper end thereof, spent treatment gas is suctioned out of the gas manifold 8. For this purpose, a suction pipe 14 protrudes into the upper end of the gas manifold 8. The block arrow 15 indicates the connection of the suction pipe 14 to a suction outlet. The suction pipe 14 does not rotate, and has no or at most slight mechanical contact with the inside wall of the gas manifold 8. The end of the suction pipe 14 protruding into the gas manifold 8 ends at a position P2, in the treatment chamber B, at which the suctioned-out and spent treatment gas is at a temperature that is higher than the condensation temperature ($T_K$) of the impurities in the treatment gas.

The production of the rotary tube 2, including the inserts, includes the following method steps:

Providing a rotary tube 2 made of quartz glass and having a length of 2500 mm and an inside diameter of 210 mm.

Providing laser-cut circular plates 6a and 6c of opaque quartz glass having a plate thickness of 5 mm and an outside diameter of 208 mm. Said plates 6a, 6c each include two openings: a circular concentric through-hole for guiding through the gas manifold 8, and an oval transfer opening 61, arranged off-center, for the $SiO_2$ grain. Providing a laser-cut circular plate 6b consisting of transparent quartz glass, having the same dimensions as the plates 6a, 6c.

Providing a gas manifold 8 made of transparent quartz glass, having an outside diameter of 40 mm and an inside diameter of 32 mm. Welding a pipe end piece, consisting of quartz glass and having a length of 50 mm, onto the end face, forming the gas manifold 8 having an overall length of 2700 mm.

Figure 2:
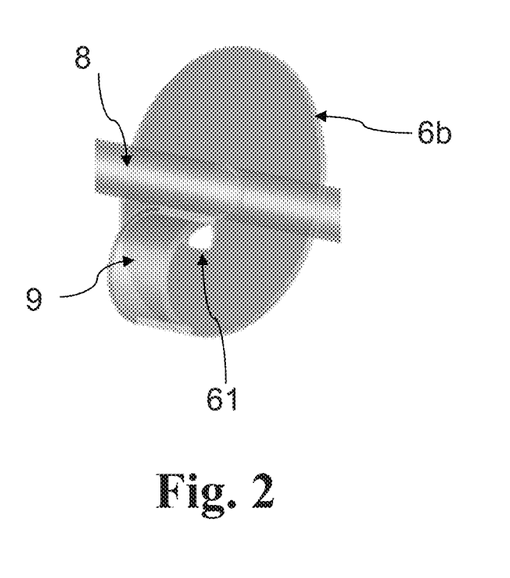
FIG. 2 is an enlarged view, compared with FIG. 1, of a separating element for dividing the treatment chamber.

Producing the vanes 9 by segmenting quartz glass tubes and welding the vanes 9 onto the quartz glass plates 6a, 6b, 6c.

Laser-cutting gas inlet and gas outlet openings (82; 83) in the wall of the gas manifold 8, and attaching a plug 81 for closing the gas manifold inner bore between the gas inlet and gas outlet openings (82; 83).

Welding the quartz glass plates 6a, 6b, 6c into the inner bore of the gas manifold 8, on a glass lathe.

Connecting the gas manifold 8 to the through-holes of the quartz glass plates 6a, 6b, 6c, and inserting this group into the inner bore of the rotary tube 2 and welding the quartz glass plates to the rotary tube inner wall by means of local heating, reducing the diameter of the rotary tube inner bore, on the glass lathe.

An embodiment of the treatment method will be described in greater detail in the following, with reference to the device illustrated schematically in FIGS. 1 and 2:

The rotary tube 2, rotating about the axis of rotation 21 thereof at 8 rpm, is supplied continuously with amorphous $SiO_2$ grain 5 to be purified, at a feed rate of 8 kg/h. In the longitudinal direction, the rotary tube 2 is inclined at the specific angle of repose of the $SiO_2$ grain 5, such that an approximately uniform thickness of the grain filling 5 arises over the length thereof, which is moved continuously from the grain inlet 22 to the grain outlet 23.

By means of the resistance heating device, the rotary kiln 1 is heated, in the region of the reaction chamber C, to a maximum temperature of approximately 1200° C. A reactive treatment gas 11 in the form of a gas mixture consisting of HCl, chlorine and nitrogen, at a volume flow of 200 l/h, is introduced into the end of the gas manifold 8 that rotates about the axis of rotation 21 and protrudes from the rotary kiln 1, beyond the rotary joint 9.

The treatment gas 11 flowing in in counterflow to the $SiO_2$ grain heats up quickly, is distributed in particular in treatment zones C and B, and is suctioned out of the gas manifold 8, by means of the suction pipe 14, at the upper end, as spent treatment gas 11.

Above the rotary kiln 1, FIG. 1 illustrates a graph having a typical temperature (T) and pressure curve (p) of the treatment gas 11. Position P2 represents the point at which the hot waste gas (spent treatment gas) is removed from the gas manifold 8 by means of the suction pipe 14. Mixing takes place here of hot waste gas and external air that is suctioned in from the outside, via the suction pipe 14 and through the gas guide tube 8. This results in a jump both n the temperature curve (T) and in the pressure curve (p) for the treatment gas. Position P1 illustrates the start of the preheating chamber B, and the position of the front quartz glass plate 6*a* consisting of reflective quartz glass. Position P3 corresponds to the start of the reaction chamber C, and position P4 corresponds to the end of the reaction chamber C and the position of the rear quartz glass plate 6*c* consisting of reflective quartz glass. Position P5 corresponds to the grain outlet. It can be seen that, in the gas phase, a pressure gradient prevails over the entire length of the rotary tube 8, which gradient brings about gas transport to the suction position P2. At the position $P_{rel}=0$, the treatment gas has a gas pressure that corresponds to the pressure prevailing outside (atmospheric pressure).

- Introducing the treatment gas via the rotating gas guide tube 8 that is sealed by the rotary joint 24 brings about a slight supply of external air into the treatment chamber 7 and contributes to a higher concentration of the reactive treatment gas 11 in the hot zone. This leads to an improved purification result, while at the same time saving reactive treatment gas and having reduced disposal costs.
- Suctioning out the still hot treatment gas 11 in position P2 means that said gas has a high concentration of dissolved foreign matter, which thus has to be removed from the treatment chamber in the gas phase. Suctioning out the waste gas at position P2, at a temperature above the condensation point $T_K$, furthermore prevents condensation at colder points and deposits in the treatment chamber 7.
- The suction pipe 14 that does not rotate within the rotary kiln is cooled by external air suctioned in from the outside, which reduces the risk of thermal deformation.
- Reversing the direction of rotation 29 stops the further transport of the $SiO_2$ grain, and therefore batch operation can be achieved, in which particularly intensive purification is possible, at the expense of the throughput.
- Forming the peripheral quartz glass plates 6*a* and 6*c* from opaque material reduces the radiation of the rotary kiln at the end face, and allows for improved sealing of the rotating rotary tube 2 and of the rotating gas manifold 8 by using sealed rotary joints.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A method for treating pourable, inorganic grain in a heated rotary tube that rotates about an axis of rotation and surrounds a treatment chamber that is divided into a plurality of treatment zones (A; B; C; D) by separating elements, the plurality of treatment zones including at least one reaction zone (C), the method comprising:
   - supplying the grain to the treatment chamber at a grain inlet side;
   - transporting the grain, in a grain transport direction, to a grain outlet side; and
   - exposing the grain to a treatment gas;
   - wherein spent treatment gas is suctioned out of the reaction zone (C) by a gas manifold, which rotates about the longitudinal axis thereof;
   - wherein the spent treatment gas is suctioned out of the gas manifold by a rotationally fixed suction pipe, which protrudes into the gas manifold;
   - wherein the treatment gas is introduced into the gas manifold at the grain outlet side and is conveyed from one chamber (A; B; C; D) to the next chamber counter to the grain transport direction and emerges from the gas manifold, into the reaction zone (C), through at least one gas outlet wall opening, and spent treatment gas enters the gas manifold again, from the reaction zone (C), through at least one gas inlet wall opening; and
   - wherein between the gas outlet wall opening and the gas inlet wall opening, the gas manifold is closed.

2. The method according to claim 1, wherein the gas manifold is rotationally fixed to at least one separating element, and in that the separating elements each comprise a transfer opening for allowing grain to pass through from one zone (A; B; C; D) to the next zone.

3. The method according to claim 2, wherein the separating elements are equipped with a grain baffle that plunges into the grain as a result of the rotation of the rotary tube and transports entrained grain to the transfer opening in the process.

4. The method according to claim 3, wherein a front separating element is arranged downstream of the grain inlet side and a rear separating element is arranged upstream of the grain outlet side, viewed in the grain transport direction, and in that the front separating element and/or the rear separating element are made from opaque quartz glass.

5. The method according to claim 4, wherein the rotary tube comprises unheated end-face end portions, and in that the front separating element and the rear separating element are each arranged in an unheated end-face end portion.

6. The method according to claim 2, wherein a front separating element is arranged downstream of the grain inlet side and a rear separating element is arranged upstream of the grain outlet side, viewed in the grain transport direction, and in that the front separating element and/or the rear separating element are made from opaque quartz glass.

7. The method according to claim 6, wherein the rotary tube comprises unheated end-face end portions, and in that the front separating element and the rear separating element are each arranged in an unheated end-face end portion.

8. The method according to claim 1, wherein the gas manifold comprises a length portion that protrudes out of the rotary tube at the grain outlet side, and in that at least the length portion is made of opaque quartz glass.

9. A rotary tube for treating pourable, inorganic grain, which tube is rotatable about an axis of rotation that is inclined relative to the horizontal, and which tube surrounds a treatment chamber for receiving the grain, which chamber is divided into a plurality of treatment zones (A; B; C; D) by separating elements, the plurality of treatment zones including at least one reaction zone (C), the rotary tube comprising:
- a grain inlet side for introducing the grain into the treatment chamber;
- a grain outlet side for discharging the grain from the treatment chamber;
- a gas inlet for introducing a treatment gas into the reaction zone (C); and
- a gas outlet for removing spent treatment gas from the treatment chamber;
- wherein the gas outlet comprises a gas manifold that rotates about the longitudinal axis thereof; and
- wherein the gas outlet comprises a suction pipe that protrudes into the gas manifold or adjoins the gas manifold without direct contact;
- wherein the gas manifold has at least one gas outlet wall opening and at least one gas inlet wall opening; and
- wherein between the gas outlet wall opening and the gas inlet wall opening, the gas manifold is closed.

10. The rotary tube according to claim 9, wherein the gas manifold comprises a tube longitudinal axis that extends coaxially to the axis of rotation of the rotary tube.

11. The rotary tube according to claim 9, wherein the gas inlet is provided at a gas inlet end of the gas manifold which is located at the grain outlet end of the rotary tube.

12. The rotary tube according to claim 11, wherein a front separating element is arranged downstream of the grain inlet side and a rear separating element is arranged upstream of the grain outlet side, viewed in the grain transport direction, and in that the front separating element and/or the rear separating element are made from opaque quartz glass.

13. The rotary tube according to claim 9, wherein the gas manifold is rotationally fixed to at least one separating element, and in that the separating elements each comprise a transfer opening for allowing grain to pass through and through which opening the gas manifold extends, and in that the separating elements are equipped with a grain baffle which is designed to plunge into the grain as a result of the rotation of the rotary tube and to transport entrained grain to the transfer opening in the process.

14. The rotary tube according to claim 13, wherein a front separating element is arranged downstream of the grain inlet side and a rear separating element is arranged upstream of the grain outlet side, viewed in the grain transport direction, and in that the front separating element and/or the rear separating element are made from opaque quartz glass.

15. The rotary tube of claim 14, wherein the rotary tube comprises unheated end-face end portions, and in that the front separating element and the rear separating element are each arranged in an unheated end-face end portion.

* * * * *